(12) United States Patent
Matsutani et al.

(10) Patent No.: US 8,448,079 B2
(45) Date of Patent: May 21, 2013

(54) COMBINING MULTIPLE IMAGES FROM DIFFERENT DISPLAY AREAS USING A PLURALITY OF REFERENCE POSITIONS

(75) Inventors: Tetsuro Matsutani, Nagoya (JP); Tetsuya Kato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 306 days.

(21) Appl. No.: 12/367,250

(22) Filed: Feb. 6, 2009

(65) Prior Publication Data

US 2009/0204890 A1 Aug. 13, 2009

(30) Foreign Application Priority Data

Feb. 6, 2008 (JP) ................................. 2008-025954

(51) Int. Cl.
*G06F 3/041* (2006.01)
(52) U.S. Cl.
USPC ........... 715/769; 715/246; 715/764; 358/409; 358/453; 358/509; 345/156
(58) Field of Classification Search
USPC .... 715/246, 764; 358/409, 453, 509; 345/156
See application file for complete search history.

(56) References Cited

U.S. PATENT DOCUMENTS

| | | | |
|---|---|---|---|
| 6,333,752 B1* | 12/2001 | Hasegawa et al. | 715/764 |
| 7,330,195 B2* | 2/2008 | Li | 345/629 |
| 7,423,655 B1* | 9/2008 | Stephens | 345/624 |
| 7,551,211 B2* | 6/2009 | Taguchi et al. | 348/239 |
| 7,724,242 B2* | 5/2010 | Hillis et al. | 345/173 |
| 2003/0184815 A1 | 10/2003 | Shiki et al. | |
| 2004/0070619 A1* | 4/2004 | Yoshio et al. | 345/764 |
| 2005/0047651 A1* | 3/2005 | Zheng | 382/162 |
| 2005/0088542 A1* | 4/2005 | Stavely et al. | 348/239 |
| 2005/0246634 A1* | 11/2005 | Ortwein et al. | 715/530 |
| 2008/0048975 A1* | 2/2008 | Leibow | 345/156 |
| 2008/0209311 A1* | 8/2008 | Agronik et al. | 715/234 |

FOREIGN PATENT DOCUMENTS

| | | |
|---|---|---|
| JP | H06-243225 A | 9/1994 |
| JP | H09-091458 A | 4/1997 |
| JP | 2003-244581 A | 8/2003 |
| JP | 2004-056299 A | 2/2004 |
| JP | 2005-092588 A | 4/2005 |
| JP | 2007-181163 A | 7/2007 |

OTHER PUBLICATIONS

Mohanad Alata and Mohammad al Shabi, Text Detection and Character Recognition Using Fuzzy Image Processing, Journal of Electrical Engineering, vol. 57, No. 5 2006.*
Japan Patent Office, Notification of Reason for Refusal for Japanese Patent Application No. 2008-025954 (counterpart to above-captioned patent application), dispatched Aug. 9, 2011.

* cited by examiner

*Primary Examiner* — Cesar Paula
*Assistant Examiner* — Mohammed-Ibrahim Zuberi
(74) *Attorney, Agent, or Firm* — Baker Botts L.L.P.

(57) ABSTRACT

An image processing apparatus is provided. The image processing apparatus includes: a display unit which displays an image; a detection unit which detects a position on the display unit designated from an outside; an original image display unit which displays an original image based on original image data in a first display area on the display unit; a specifying unit which, when a position within the first display area is designated from the outside, specifies a designated region corresponding to the designated position in the first display area based on a detection result of the detection unit; and a combining unit which displays at least a part of an additional image in the designated region in the first display area to display a combined image, in which the original image and the additional image are combined, on the display unit.

9 Claims, 12 Drawing Sheets

LOWER-CASE LETTER "o"

CALCULATION EXPRESSION
$X^2 + Y^2 \leq 100$

12b: CHARACTER REGION DEFINITION TABLE

51  $(X - 200)^2 + (Y - 100)^2 = 100$

COMBINING MULTIPLE IMAGES FROM DIFFERENT DISPLAY AREAS USING A PLURALITY OF REFERENCE POSITIONS

CROSS-REFERENCE TO RELATED APPLICATION

This application claims priority from Japanese Patent Application No. 2008-025954, filed on Feb. 6, 2008, the entire subject matter of which is incorporated herein by reference.

TECHNICAL FIELD

Aspects of the present invention relate to an image processing apparatus and an image processing program.

BACKGROUND

A device has a media print function of directly printing out image data photographed by a digital camera and the like stored in a memory card by mounting the memory card in a slot provided in the device, without using a personal computer. A device is configured such that image data read from the memory card can be previewed on a display panel.

Further, a photographing apparatus, which is installed in an amusement facility and the like, automatically photographs a user in a set photo booth and prints a photographed image on print media, such as a seal, and then provides the seal to the user.

For example, JP-A-2007-181163 describes a photographing apparatus including an image arranging unit that arranges a frame image on the entire photographed image so as to overlap and an image detecting unit that deletes at least a part of the frame image arranged by the image arranging unit so that a user can edit the photographed image according to the user's preference.

However, in the apparatus described in JP-A-2007-181163, the photographed image and the frame image are displayed in a state of being combined in advance, and the user performs editing while viewing the combined state. Accordingly, for example, when the user wants to add an edit image little by little without breaking the atmosphere of the original photographed image, it becomes difficult to see the original photographed image itself.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide an image processing apparatus and an image processing program allowing a user to designate a suitable region as a combining position of an additional image while checking the content or atmosphere of an original image.

According to an exemplary embodiment of the present invention, there is provided an image processing apparatus including: a display unit which displays an image; a detection unit which detects a position on the display unit designated from an outside; an original image display unit which displays an original image based on original image data in a first display area on the display unit; a specifying unit which, when a position within the first display area is designated from the outside, specifies a designated region corresponding to the designated position in the first display area based on a detection result of the detection unit; and a combining unit which displays at least a part of an additional image based on additional image data in the designated region in the first display area to display a combined image, in which the original image and the additional image are combined, on the display unit.

According to another exemplary embodiment of the present invention, there is provided a computer-readable medium having a computer program stored thereon and readable by a computer including a display unit which displays an image and a detection unit which detects a position on the display unit designated from an outside, the computer program, when executed by the computer, causing the computer to perform operations. The operations include: displaying an original image based on original image data in a first display area on the display unit; when a position within the first display area on the display unit is designated from the outside, specifies a designated region corresponding to the designated position in the first display area based on a detection result of the detection unit; and displaying at least a part of an additional image based on additional image data in the specified designated region in the first display area to display a combined image, in which the original image and the additional image are combined, on the display unit.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

Figure 1:
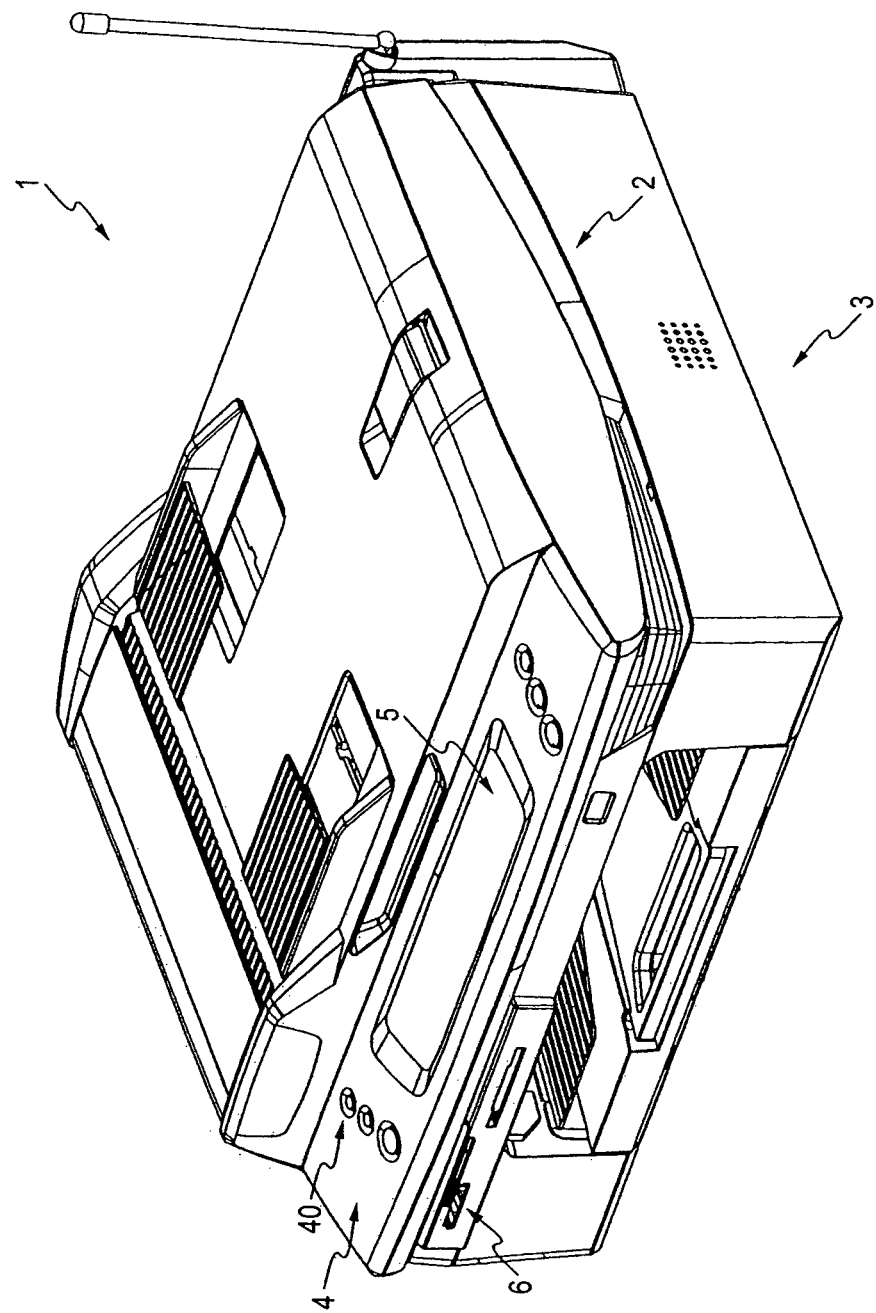
FIG. 1 is a perspective view showing the configuration of outer appearance of a MFP according to an exemplary embodiment of the present invention.

Hereinafter, exemplary embodiments of the present invention will be described with reference to the accompanying drawings. FIG. 1 is a perspective view showing the configuration of outer appearance of a multi function peripheral (hereinafter, referred to as an 'MFP') 1 according to an exemplary embodiment of the present invention.

The MFP 1 is a multi function peripheral having various functions, such as a photo capture function, a copy function, a facsimile function, and a scanner function.

In addition, the MFP 1 reads original image data from a memory card mounted in a memory card slot 6 and displays an original image based on the original image data on an LCD 5.

Moreover, the MFP 1 is configured such that an additional image showing, for example, a photograph date may be combined in the original image and displayed on the LCD 5 and a user can designate a suitable region as a combining position of the additional image while checking the content or atmosphere of the original image, which will be described in detail later. Herein, the additional image may be a photograph, pattern, and the like and may include a character. Additionally, the character may include any character defined by a character code and may include not only a character for expressing a language but also a symbol and a figure.

A scanner 2 for reading a document in executing a facsimile function, a scanner function, or a copy function is provided at an upper portion of the MFP 1. A glass plate for placing a document thereon is provided at a lower side of a document cover. In addition, a printer 3 which is a so-called ink-jet printer is provided, as a device that prints an image on a recording sheet, in a housing.

The memory card slot 6 is provided on a front surface of the MFP 1. Image data read by the scanner function can be stored in a memory card mounted in the memory card slot 6, or original image data can be read from the memory card mounted in the memory card slot 6 by the photograph capture function and is then displayed on the LCD 5 or printed on a recording medium.

In addition, a horizontally long operation panel 4 is provided in front of the document cover. An operation key 40, the LCD 5, and a touch panel 7 (see FIG. 2) are provided on the operation panel 4. The MFP 1 displays, on the LCD 5, an operation procedure or a state of processing being executed while displaying information corresponding to an operation of the operation key 40 or the touch panel 7.

The touch panel 7 is a kind of input device and is provided on a screen of the LCD 5. When a user touches the LCD 5 with a finger, the touch panel 7 can detect the touch position of the finger as a designated position designated from the outside to the LCD 5.

Figure 2:
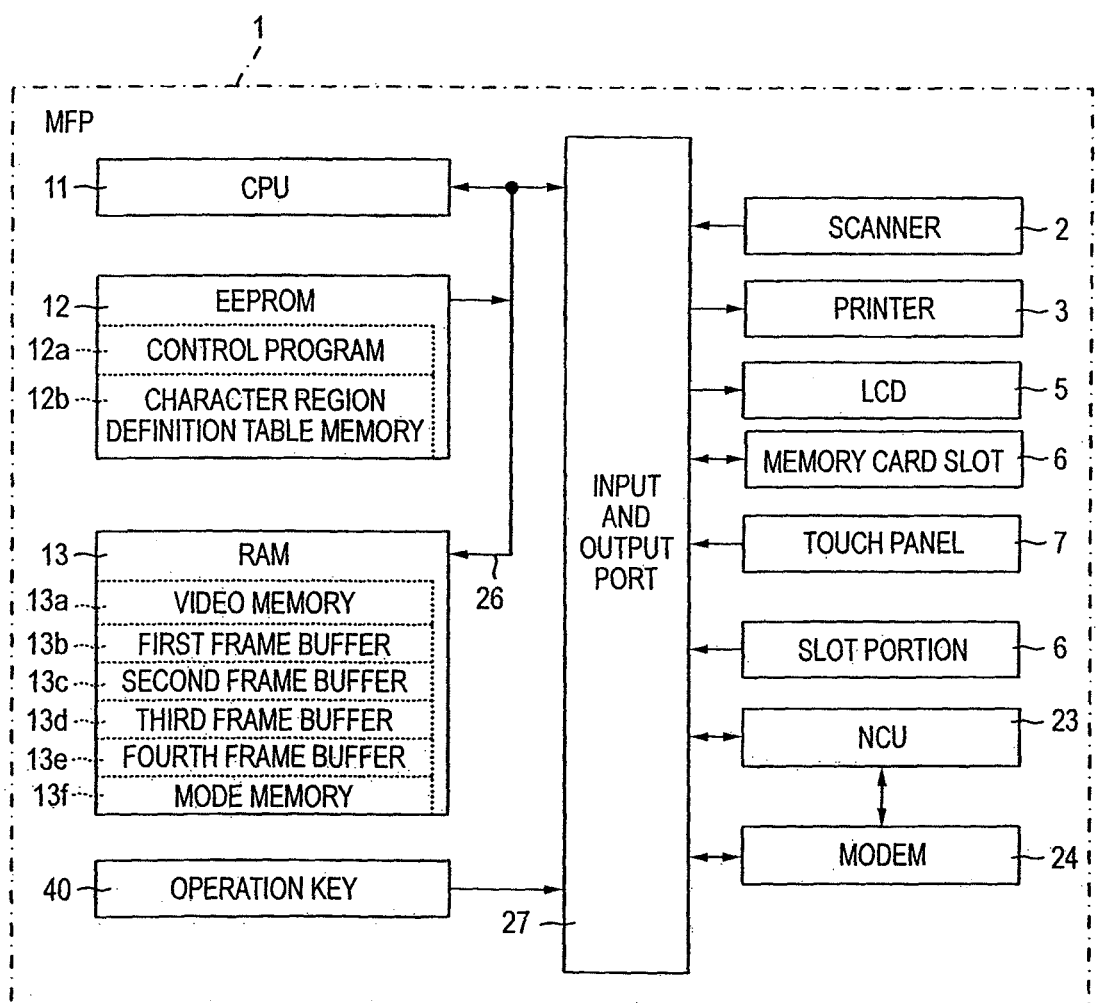
FIG. 2 is a block diagram showing the electrical configuration of the MFP.

Next, the electrical configuration of the MFP 1 will be described with reference to FIG. 2. The MFP 1 mainly includes a central processing unit (CPU) 11, an electronically erasable and programmable read only memory (EEPROM) 12, a random access memory (RAM) 13, the scanner 2, the printer 3, the LCD 5, the touch panel 7, the memory card slot 6, an NCU 23, a modem 24, and the operation key 40.

Among those described above, the CPU 11, the EEPROM 12, and the RAM 13 are connected to one another through a bus line 26. In addition, the operation key 40, the LCD 5, the touch panel 7, the scanner 2, the printer 3, the memory card slot 6, the NCU 23, the modem 24, and the bus line 26 are connected to one another through an input and output port 27.

The CPU 11 controls each function that the MFP 1 has or each portion connected with the input and output port 27 according to a fixed value or program stored in the EEPROM 12 or the RAM 13 or various signals transmitted and received through the NCU 23.

The EEPROM 12 is a nonvolatile memory capable of storing, for example, fixed value data or a control program 12a executed by the CPU 11 so that the fixed value data or the control program 12a can be rewritten and of holding the content even after the power is off. The control program 12a includes a program related to flow charts illustrated in FIGS. 6 to 10, which will be described later.

In addition, a character region definition table 12b is provided in the EEPROM 12. The MFP 1 determines a region including a character display area such that when a character included in an additional image is combined in the original image, a part of the character to be combined in the original image is not missing, which will be described in detail later. A calculation expression for determining a region including a character is stored in the character region definition table 12b, which will be described in detail later with reference to FIGS. 9A to 9C.

The RAM 13 temporarily stores various kinds of data when executing various operations of the MFP 1. The RAM 13 includes a video memory 13a, a first frame buffer 13b, a second frame buffer 13c, a third frame buffer 13d, a fourth frame buffer 13e, and a mode memory 13f.

The video memory 13a stores the content displayed on the LCD 5. Data written in the video memory 13a is formed by combination of data (frames) stored in the first frame buffer 13b, the second frame buffer 13c, the third frame buffer 13d, and the fourth frame buffer 13e. In addition, the content of the data stored in the video memory 13a and the first to fourth frame buffers 13a to 13e will be described later with reference to FIGS. 5A to 5D.

The mode memory 13f stores which one of a scratch mode and a delete mode is currently set. The scratch mode is a mode in which the additional image is combined in the original image, and the delete mode is a mode in which a portion, which is designated by the user, of the additional image combined in the original image is deleted. Processing executed in each mode will be described later with reference to FIGS. 7 to 10. The user can set either the scratch mode or the delete mode, for example, by operating the operation panel 4.

The NCU 23 is connected to a telephone network (not shown) and controls transmission of a dial signal to the telephone network, response of a call signal from the telephone network, and the like. The modem 24 modulates image data, transmission of which is instructed by the facsimile function, to a signal, which can be transmitted to the telephone network, and transmits the signal through the NCU 23. In addition, the modem 24 receives a signal, which is input through the NCU 23 from the telephone network, and displays the signal on the LCD 5 or demodulates the signal to image data recordable by the printer 3.

Next, a screen of the LCD 5 in the scratch mode will be described with reference to FIGS. 3A to 3D and 4A and 4B. FIGS. 3A to 3D are views showing the transition of display of the LCD 5 in the scratch mode.

Figure 3A:
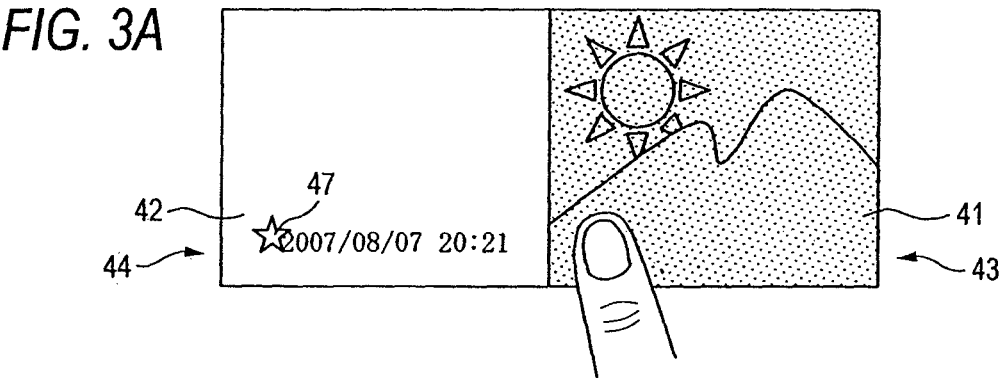
FIG. 3A is a view showing an example of display of an LCD at the start of a scratch mode.

As shown in FIG. 3A, on the LCD 5 at the start of the scratch mode, an original image 41 based on the original image data read from the memory card is displayed in the right half of a display area of the LCD 5. In addition, an additional image 42 is displayed on the left half of the display area of the LCD 5, adjacent to the original image 41.

It is noted that, in the present exemplary embodiment, an image that includes a character string showing photograph date and time information read from the header of the original image data and has a white color as a background color is illustrated as an example of the additional image 42. However, other information may also be used as the additional image 42.

Moreover, in the present exemplary embodiment, it is assumed that the right-half area of the screen of the LCD 5 where the original image 41 is displayed at the start of the scratch mode is referred to as a 'right screen 43' and the left-half area of the screen of the LCD 5 where the additional image 42 is displayed at the start of the scratch mode is referred to as a 'left screen 44'. As shown in FIGS. 3A to 3D, the right screen 43 and the left screen 44 have the same shape and size.

In addition, as shown in FIG. 3A, when a position (surface) on the right screen 43 of the LCD 5 of the MFP 1 is touched by a finger or the like from the outside, the MFP 1 displays on the left screen 44 an indicator 47 that indicates a position on the left screen 44 corresponding to the designated position touched on the right screen 43. By the indicator 47, the user can see the position on the left screen 44 corresponding to the designated position touched by the user. Here, since the right screen 43 and the left screen 44 have the same shape and size, the position on the left screen 44 corresponding to the designated position on the right screen 43 can be easily specified based on coordinate data. That is, the right screen 43 and the left screen 44 are configured such that the designated position can be specified or display areas on the screen can be managed by common coordinate data.

Figure 3B:
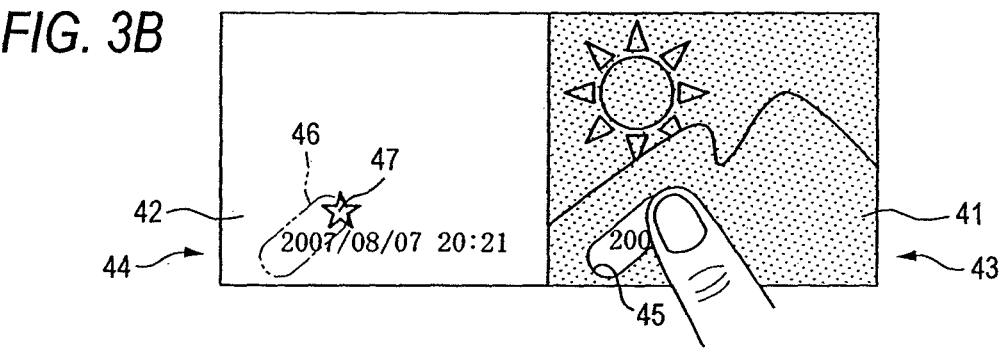
FIGS. 3B to 3D are views showing a state where a position on a right screen of the LCD is touched.
Figure 3C:
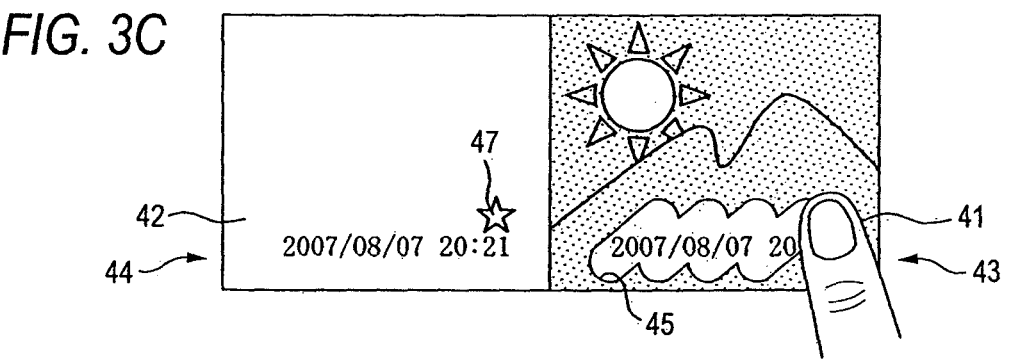
Figure 3D:
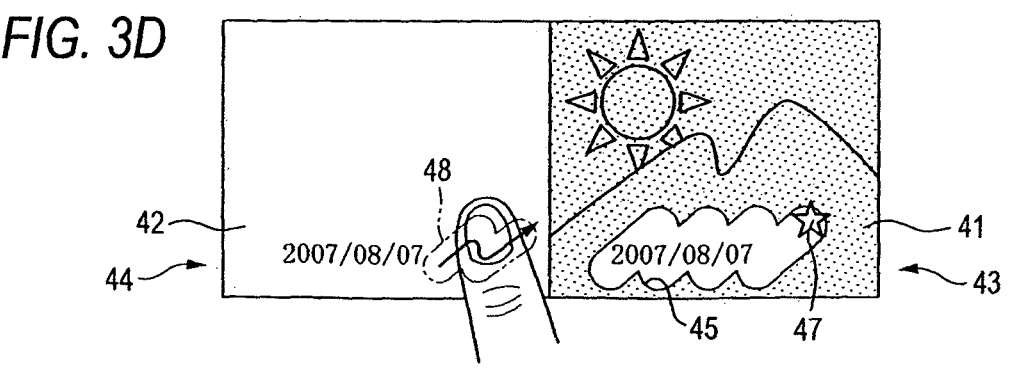

As shown in FIGS. 3B to 3D, the MFP 1 specifies a designated region 45 on the right screen 43 based on the locus of a plurality of designated positions occurring in tracing the surface of the right screen 43 with a finger. Specifically, a circular region having a radius of A dots with a touch position as a center, which is detected by the touch panel 7, is specified as the designated region 45. In addition, 'A' is a value set in advance. In practice, when tracing a screen with a finger, the touch position is not one point but a plurality of touch positions are detected according to the movement of the finger. Therefore, the designated region 45 becomes a region obtained by moving the center of the circular region having the radius of A dots little by little based on the plurality of touch positions so as to overlap.

In addition, when the designated region 45 is specified, the MFP 1 specifies a corresponding region 46 on the left screen 44 corresponding to the designated region 45 on the right screen 43. In addition, an image in the corresponding region 46 is copied to the designated region 45. Specifically, the display of the designated region 45 of the right screen 43 is replaced with a portion of the additional image 42 displayed on the corresponding region 46 of the left screen 44. As shown in FIG. 3B, the corresponding region 46 is a region specified such that the relative positional relationship of the corresponding region 46 to the left screen 44 becomes equal to that of the designated region 45 to the right screen 43.

According to this configuration, a combined image, in which the original image 41 and the additional image 42 are combined, is displayed on the right screen 43 by displaying a part of the additional image 42 in the designated region 45 as described above, so that the user can view the combined image.

In addition, since the portion of the additional image 42 displayed in the corresponding region 46 of the left screen 44 corresponding to the designated region 45 on the right screen 43 is combined in the original image 41, the user can combine an arbitrary portion of the additional image 42 in the original image 41.

In FIG. 3B, although the corresponding region 46 on the left screen 44 is shown in a two-dot chain line, this is only for easy understanding, and the two-dot chain line is not actually displayed on the LCD 5.

As shown in FIGS. 3B and 3C, when the designated position detected by the touch panel 7 moves, the MFP 1 updates the designated region 45 according to the change of the designated position. That is, a region obtained by adding a width corresponding to the radius of A dots to the locus of the designated position detected by the touch panel 7 is specified as the designated region 45 and is expanded with the movement of the designated position. Whenever the designated region 45 is updated, display of the additional image is updated in the designated region 45. That is, the combined image is updated. At the same time, the display position of the indicator 47 is updated with the change of the designated position.

In this manner, the user can make the combined image displayed with a sense like exposing an additional image existing behind an original image by rubbing an arbitrary portion of the right screen 43, on which the original image 41 is displayed, with a finger or the like. As a result, it becomes easy and intuitive to partially combine the additional image 42 in the original image 41.

In addition, the user can view the combined image updated according to expansion of the designated region 45 while expanding the designated region 45 by moving the designated position in a desired direction with user's operation. In addition, since the region obtained by adding the width to the locus of the designated position is specified as the designated region 45, the user can easily designate a small region, for example, compared with a case in which a region within a closed curve defined by the locus of a designated position is specified as a designated region. As a result, an operation becomes easy even if the display area of the LCD 5 is small.

Then, for example, when a user's instruction to end editing for the combining result is input, the MFP 1 creates print data by processing and editing original image data such that the same image as the combining result can be printed, and then outputs the print data to the printer 3 or stores the print data in a storage medium, such as a memory card.

According to the MFP 1, since the combined image where the additional image 42 is combined in the designated region 45 is displayed after the user designates the designated region 45 where the additional image 42 is to be combined while viewing the original image 41 (after the user touches the right screen 43 in the present exemplary embodiment), the user can designate a suitable region of the original image 41 as a combining position of the additional image 42 while checking the content or atmosphere of the original image.

In addition, the user can see which portion of the entire additional image 42 is combined in the original image 41 by checking the indicator 47 displayed on the left screen 44.

According to the MFP 1, the user can individually view the original image 41 and the additional image 42 to be combined in the original image 41 by the right screen 43 and the left screen 44 of the LCD 5. Accordingly, the user can designate a suitable region of the original image 41 as a combining position of the additional image 42 while viewing the content or atmosphere of each of the original image 41 and the additional image 42.

As shown in FIGS. 3A to 3D, the additional image on the left screen 44 of the LCD 5 is displayed with a same display magnification as the additional image 42 combined in the original image 41 displayed on the right screen 43. In this manner, the user can designate a suitable region of the original image 41 as a combining position of the additional image while considering the size of the additional image by viewing the additional image with the same display magnification on the left screen 44 to check the size of the additional image 42, which is to be combined in the original image 41.

In addition, since the right screen 43 and the left screen 44 have the same size, the user can clearly recognize the size relationship between the original image 41 and the additional image 42 to be combined in the original image 41.

As shown in FIG. 3D, when the touch panel 7 detects that the user has touched (designated) a position (surface) on the left screen 44, the MFP 1 moves the indicator 47 to a position on the right screen 43 corresponding to the designated position on the left screen 44. In this manner, the user can view the position on the right screen 43 corresponding to the designated position even if the user touches the left screen 44.

When it is determined that the position (surface) on the left screen 44 is designated based on the detection result of the touch panel 7, the MFP 1 replaces a portion, which is displayed in a circular region 48 having a radius of B dots with the designated position as a center, of the additional image 42 with the background color of the left screen 44. The 'B' is a value set in advance. Thus, some characters of the additional image 42 in the region 48 are deleted. The processing of replacing the inside of the region 48 with a background color is an example of deleting a portion displayed in a region based on the designated position. However, instead of this processing, processing of painting the region 48 with a color other than the background color may be performed.

Moreover, deletion of a portion of the additional image 42 on the left screen 44 is reflected on the combined image displayed on the right screen 43, that is, the additional image already combined in the original image 41. In other words, the designated region 45 on the right screen 43 remains as it is and a portion of a character, which has been replaced with the background color on the left screen 44, of the additional image combined in the designated region 45, is replaced with the background color like the left screen 44.

In this manner, the user can easily delete the portion of the additional image in the combined image by operating the left screen 44 side when the user wants to modify the combined additional image 42 after viewing the combined image. Thus, the combined image that the user wants can be displayed. In FIG. 3D, although the region 48 is shown in a two-dot chain line, this is only for easy understanding, and the two-dot chain line is not actually displayed on the LCD 5.

Figures 4A, 4B:
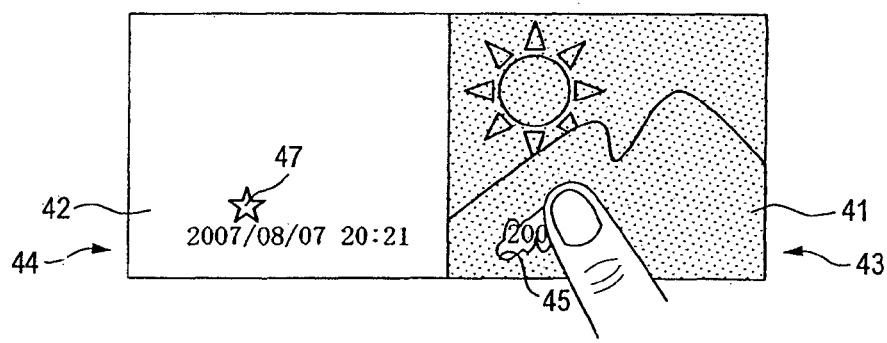
FIG. 4A is a view showing an example of a character region that the MFP determines based on text data.
FIG. 4B is a view showing an example of additional image combining based on the character region.

Next, processing that the MFP 1 executes when a character string of text data is included in the additional image 42 will be described with reference to FIGS. 4A and 4B. FIG. 4A is a view showing an example of a character region 51 defined as a region including a character display area, and FIG. 4B is a view showing an example of combining an additional image based on the character region 51. In the example described with reference to FIGS. 3A to 3D, the additional image including a character portion is combined in the designated region 45 of the right screen 43 regardless of whether a character is included in the corresponding region 46 of the left screen 44. On the other hand, in the example shown in FIGS. 4A and 4B, when a position on the left screen 44 corresponding to a designated position on the right screen 43 is included in the character region 51, an entire character in the character region 51 is combined on the right screen 43, as shown in FIG. 4B.

Specifically, when a character string including one or more characters is included in the additional image 42 and text data of the character string can be acquired, the MFP 1 determines a character region 51, which is defined as a region including a character display area, for each character included in the character string as shown in FIG. 4A. A method of determining the character region 51 will be described later with reference to FIGS. 9A to 9C.

Then, it is determined whether the position on the left screen 44 corresponding to the designated position on the right screen 43 designated by the user is included in the character region 51 of a character. Then, when the position on the left screen 44 is included in the character region 51, the additional image is combined in the original image 41 by specifying the designated region 45 such that the entire character region 51 can be included, as shown in FIG. 4B.

In this manner, without thinking of whether the entire part of a character can be included, the user can combine an entire region of a character in the original image 41 only by designating one point on the right screen 43 corresponding to a desired character displayed on the left screen 44. That is, when an area of the corresponding region 46 of the left screen 44 corresponding to the designated region 45 specified by user's designation on the right screen 43 exists up to the middle of a character included in the additional image, a part of the character might be missing if the additional image of the corresponding region 46 is combined in the designated region 45 as it is. In contrast, according to the above-described method, since the additional image is combined in the unit of the character region 51, it is possible to prevent a part of a character from being missing in the combining result.

Figure 5A:
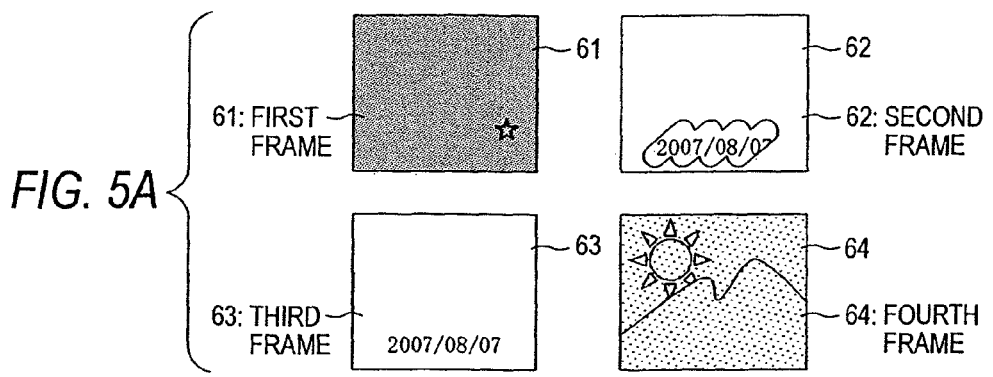
FIG. 5A is a schematic view showing frames written in a frame buffer.
Figure 5B:
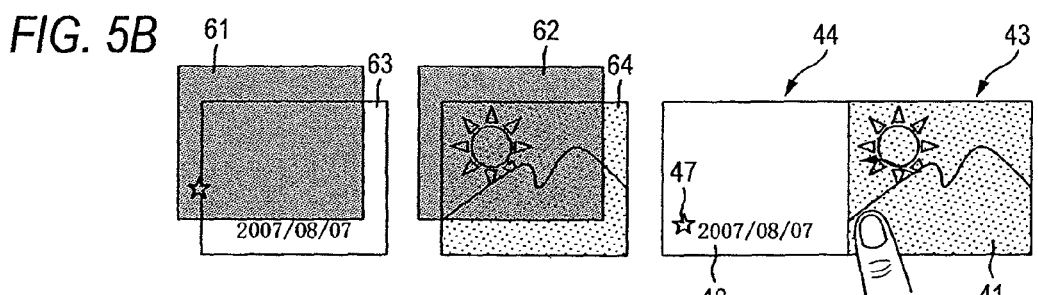
FIGS. 5B to 5D are schematic views in which frames and an image displayed on the LCD are arranged laterally.
Figure 5C:
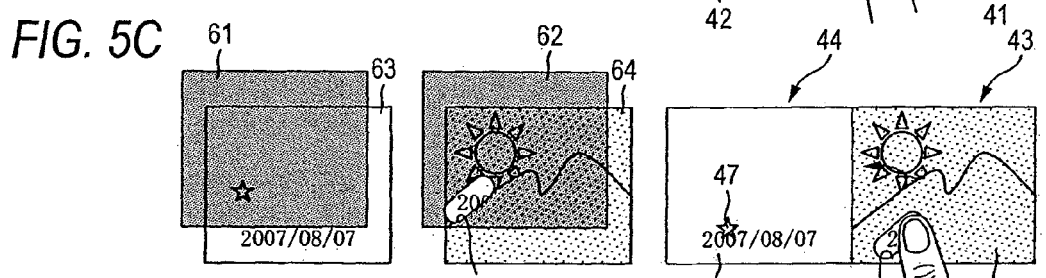
Figure 5D:
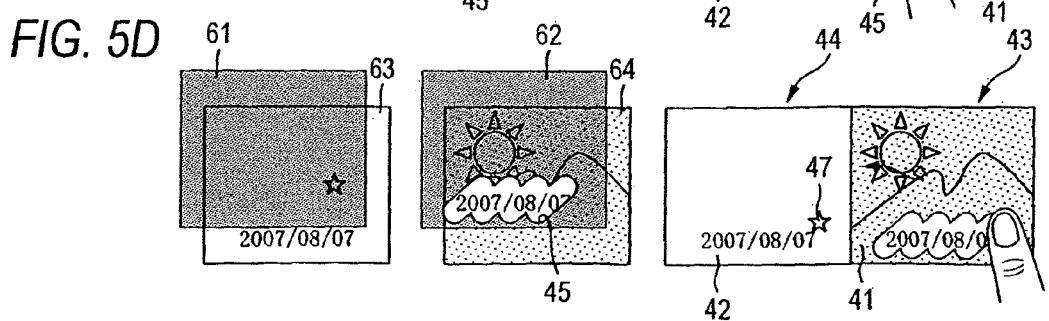

Next, a configuration for displaying a combined image on the right screen 43 and the left screen 44 will be described with reference to FIGS. 5A to 5D. FIG. 5A is a schematic view showing a first frame 61, a second frame 62, a third frame 63, and a fourth frame 64. In FIGS. 5B to 5D, although the first frame 61 and the second frame 62 are colored, actual color of each frame is not shown. The first frame 61 is data written in the first frame buffer 13*b* in the RAM 13, the second frame 62 is data written in the second frame buffer 13*c*, the third frame 63 is data written in the third frame buffer 13*d*, and the fourth frame 64 is data written in the fourth frame buffer 13*e*.

As shown in FIG. 5A, the first frame 61 is data for showing the indicator 47, and the second frame 62 is data for showing the designated region 45 and an additional image in the designated region 45. The third frame 63 is data which displays the additional image 42, and the fourth frame 64 is data which displays the original image 41. Each of the frames 61, 62, 63, and 64 is configured to include data indicating R, G, and B values for every pixel.

FIGS. 5B to 5D are schematic views in which the frames 61, 62, 63, and 64 and an image displayed on the LCD 5 are arranged laterally.

As shown in FIG. 5B, data obtained by overlapping the first frame 61 and the third frame 63 each other is written in a region of the video memory 13*a* corresponding to the left screen 44 of the LCD 5, and the additional image 42 and the indicator 47 based on the data are displayed on the left screen.

Data obtained by overlapping the second frame 62 and the fourth frame 64 each other is written in a region of the video memory 13*a* corresponding to the right screen 43 of the LCD 5, and an image is displayed on the right screen 43 based on the data. Here, since the designated region 45 has been not designated yet, only the original image 41 is displayed on the right screen 43. In the present exemplary embodiment, uniform pixel data, for example, white pixel data is written in the entire second frame 62 at an initial state. When overlapping the frames, internal setting is made such that a portion of white pixel data in the second frame 62 is treated as no data. When overlapping the second frame 62 and the fourth frame 64 each other, data processing is performed such that data of the second frame is positioned on a front surface.

In FIGS. 5B to 5D, in order for easy recognition, the first frame 61 and the third frame 63 are shown to deviate from each other and the second frame 62 and the fourth frame 64 are shown to deviate from each other. In actual display, however, the frames overlap each other such that regions displayed by the frames completely match.

Then, as shown in FIG. 5C, when a user touches the LCD 5 to designate the right screen 43, a circular region having the radius of A dots with the designated position as a center is specified as the designated region 45. Then, the corresponding region 46 of the left screen 44 corresponding to the specified designated region 45 is specified, and data of pixels included in the specified corresponding region 46 is read from the third frame 63. Then, the read pixel data is copied as data of pixels corresponding to the designated region 45 in the second frame 62. As a combining result of the fourth frame 64 and the second frame 62 created as described above, a combined image in which the additional image is combined in the designated region 45 is displayed on the right screen 43 of the LCD 5.

Then, as shown in FIG. 5D, when the user moves a finger or the like to change the designated position, the designated region 45 is updated as the designated position changes. Then, data of pixels of the third frame 63 corresponding to the expanded portion of the designated region is copied to a corresponding position of the second frame 62.

In the present exemplary embodiment, all data of pixels included in the designated region 45 in the second frame 62 is replaced with data of corresponding pixels of the third frame. Accordingly, since the background color of the designated region 45 on the right screen 43 becomes equal to that of the left screen 44, the designated region 45 is displayed on the right screen 43 so as to be distinguished from the other region which is not designated. As a result, the user can appropriately view the designated region 45.

Next, the above processing that the MFP 1 executes will be described with reference to FIGS. 6 to 10. This display processing is executed when start of reading an edit image is operated by the user, for example, though a menu selection from functions that the MFP 1 has. In addition, the processing is ended when other functions are selected.

First, it is determined whether it is selected which original image 41 or additional image 42 is to be displayed and an instruction of OK is input by the user, or initialization of display of the LCD 5 is selected by the user (S1).

When the determination in step S1 is positive (S1: Yes), the first frame buffer 13*b* and the second frame buffer 13*c* are initialized (S2). Then, additional image data is created based on, for example, photograph date and time information read from the header of original image data, and is copied to the third frame buffer 13*d* (S4). Then, the original image data, which is to be displayed, read from a memory card is copied to the fourth frame buffer 13*e* (see FIG. 2) (S6).

Then, the first frame 61 and the third frame 63 are made to overlap each other and are written in a region corresponding to the left screen 44 of the video memory 13*a*, and the second frame 62 and the fourth frame 64 are made to overlap each other and are written in a region corresponding to the right screen 43 of the video memory 13*a* (S8). As a result the original image 41 based on the original image data read from the memory card is displayed on the right screen 43, and the additional image 42 is displayed on the left screen 44 so as to be adjacent to the original image 41.

On the other hand, when the determination in step S1 is negative (S1: No), it is then determined whether an operation for selecting a mode is performed (S9). When the determination in step S9 is negative (S9: No), the process returns to step S1.

On the other hand, when the determination in step S9 is positive (S9: Yes), it is then determined whether a scratch mode is selected (S10). When the determination in step S10 is positive (S10: Yes), it is then determined whether text data of a character string included in the additional image 43 can be acquired (S12). When the determination in step S12 is positive (S12: Yes), the additional image combining processing based on a character region described with reference to FIGS. 4A and 4B is executed (S16), and the process returns to step S1. Details of the additional image combining processing (S16) will be described later with reference to FIG. 8.

On the other hand, when the determination in step S12 is negative (S12: No), the additional image combining processing described with reference to FIGS. 3A to 3D is executed (S14), and the process returns to step S1. The additional image combining processing will be described later with reference to FIG. 7.

When the determination in step S10 is negative (S10: No), delete mode processing (S18) is executed, and the process returns to step S1. The delete mode processing (S18) will be described later with reference to FIG. 10. Then, the original image 41 and the additional image 42 selected by the user are displayed on the LCD 5, or processing according to the set mode is executed.

Figure 6:
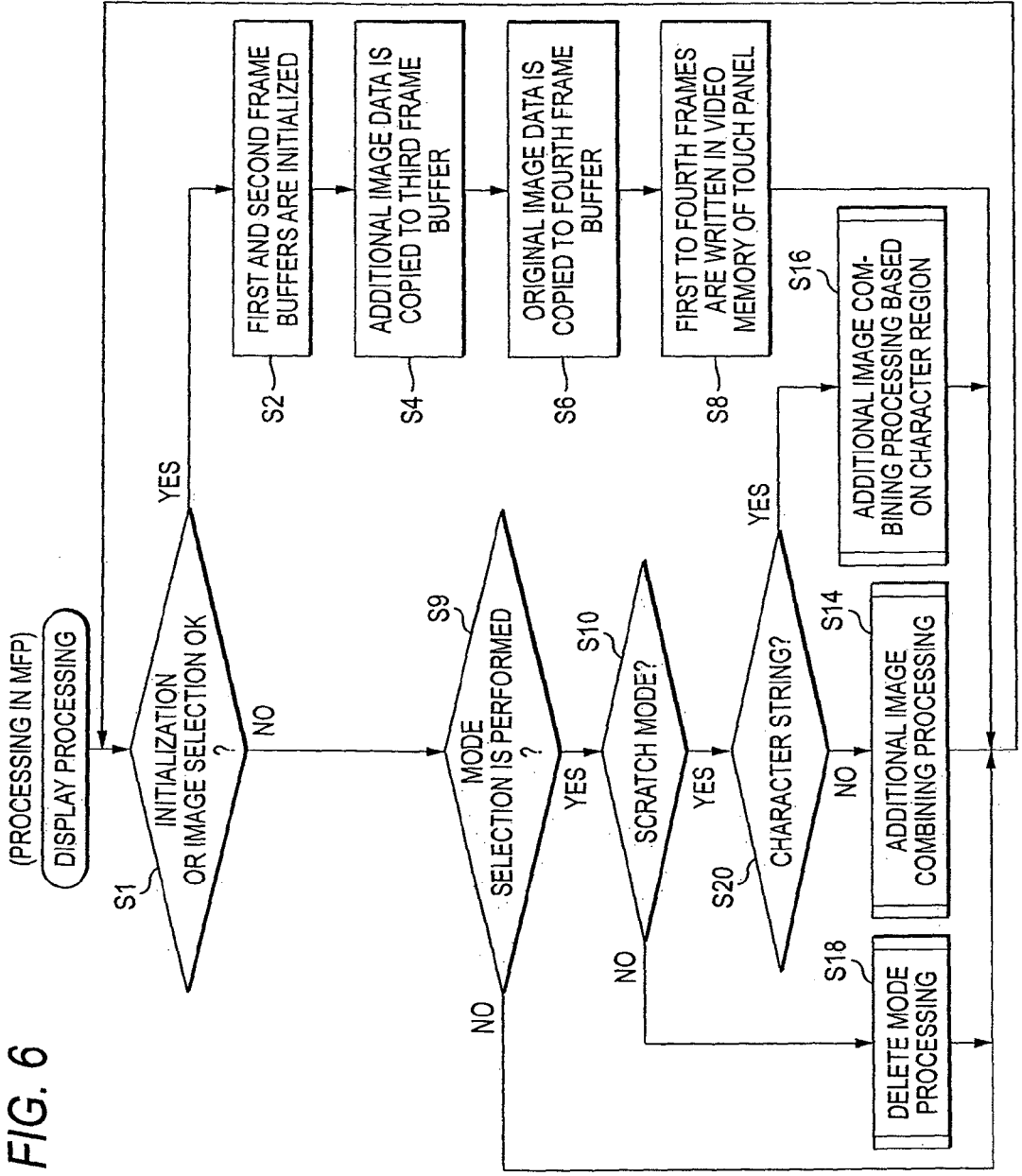
FIG. 6 is a flow chart showing display processing executed by the MFP.

If the user inputs an instruction to end editing in a state where the original image 41 or a combined image, in which the additional image 42 is combined in the original image 41, is displayed on the right screen 43 of the LCD 5 while the display processing shown in FIG. 6 is being executed, the MFP 1 stops the display processing. Then, image data of the image displayed on the right screen 43 is created based on original image data and additional image data, and the process proceeds to a processing of printing or storing the created data. In this manner, the user can print or store the combined image when the user edits the combined image while viewing the right screen 43 and then a desired combined image is completed. That is, the right screen 43 can be used as a preview screen.

In the additional image combining processing (S14), a touch position (designated position) detected by the touch panel 7 is first acquired. Then, it is determined whether the right screen 43 of the LCD 5 is touched (or whether there is a designation from the outside) based on the acquired touch position (S704). When the determination in step S704 is positive (S704: Yes), coordinate information (xr, yr) indicating the touch position on the right screen 43 is calculated based on the touch position and the designated region 45 (see FIGS. 3A to 3D), which is a circular region having a radius of A dots with a position indicated by the coordinate information (xr, yr) as a center, is specified (S705).

Then, the corresponding region 46 of the left screen 44 corresponding to the designated region 45 is specified, data of pixels included in the corresponding region 46 is read from the third frame buffer 13*d*, and the data is copied to the second frame buffer 13*c* as data of pixels included in the designated region 45 (S706).

In addition, data for displaying the indicator 47 at the position of the left screen 44 corresponding to the position indicated by the coordinate information (xr, yr) is written in the first frame buffer 13*b* (S708).

Then, it is determined whether a display update time set in advance has elapsed (S710). When the determination in step S710 is positive (S710: Yes), the first frame 61 and the third frame 63 are made to overlap each other and are written in the region corresponding to the left screen 44 of the video memory 13a, and the second frame 62 and the fourth frame 64 are made to overlap each other and are written in the region corresponding to the right screen 43 of the video memory 13a (S712). On the other band, when the determination in step S710 is negative (S710: No), processing of S712 is skipped.

Then, it is determined whether the user is instructed to end the additional image combining processing S14 (S714). This is determined based on whether the end of editing is input by the user, for example. When the determination in step S714 is negative (S714: No), the process returns to step S702 to repeat the processing. As a result, the designated region 45 is sequentially updated according to a user's change of designated position, and the display of the additional image 42 in the designated region 45 is updated based on the updated designated region 45, such that the combined image is updated. Since such an update of display was described in detail in FIG. 3, a detailed explanation thereof will be omitted.

When the determination in step S714 is positive (S714: Yes) while repeating the processing as described above, the additional image combining processing (S14) is ended.

Figure 7:
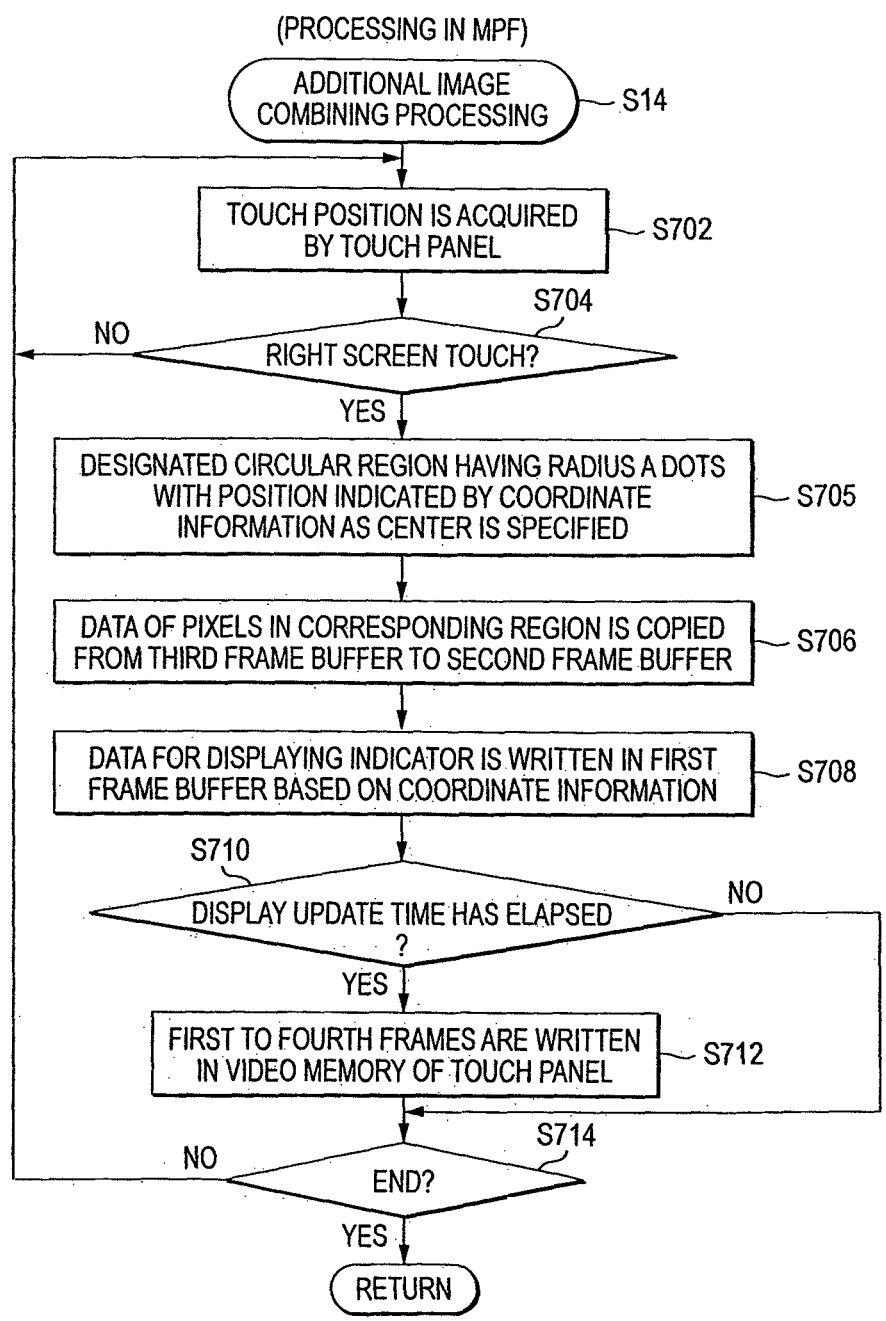
FIG. 7 is a flow chart showing additional image combining processing executed by the MFP.
Figure 8:
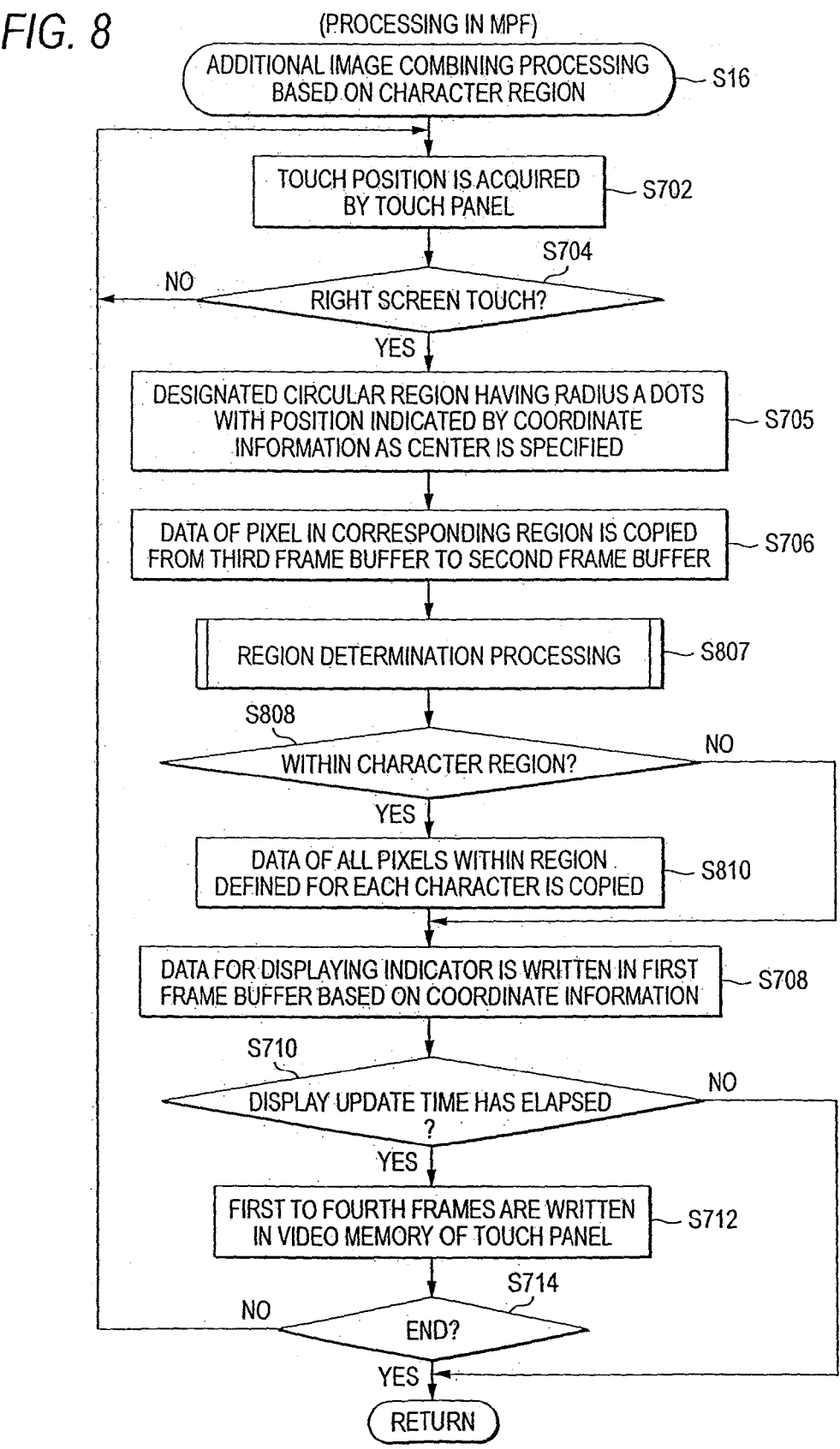
FIG. 8 is a flow chart showing additional image combining processing based on a character region, which is executed by the MFP.

FIG. 8 is a flow chart showing the additional image combining processing (S16) based on a character region which is executed by the MFP 1. Although the additional image combining processing (S16) based on a character region is different from the additional image combining processing (S14) described with reference to FIG. 7 in that the designated region 45 is specified to include all characters as described with reference to FIGS. 4A and 4B, the additional image combining processing (S16) and the additional image combining processing (S14) are the same in processing that the additional image 42 is combined. Accordingly, processing of the additional image combining processing (S16) based on a character region similar to those in the additional image combining processing (S14) described with reference to FIG. 7 are denoted by the same reference numerals, and an explanation thereof will be omitted.

In the additional image processing (S16) based on a character region, data of pixels included in the corresponding region 46 of the left screen 44 corresponding to the designated region 45 is copied from the third frame 63 to the second frame 62 (S706) and then region determination processing is executed (S807). This region determination processing (S807) is processing for determining whether a position on the left screen 44 corresponding to the designated position on the right screen 43 is included in the character region 51 and will be described in detail later with reference to FIG. 9.

Then, it is determined whether the position on the left screen 44 corresponding to the designated position on the right screen 43 is included in the character region 51, as a result of the region determination processing (S807), (S808). When the determination in step S808 is negative (S808: No), the step S810 is skipped to proceed to step S708.

On the other hand, when the determination in step S808 is positive (S808: Yes), data of pixels of the character region 51 (see FIGS. 5A to 5D) determined to be included is copied from the third frame buffer 13d to the second frame buffer 13c (S810). Thus, the entire character region 51 of the character can be combined in the original image (see FIGS. 4A and 43).

Figure 9A:
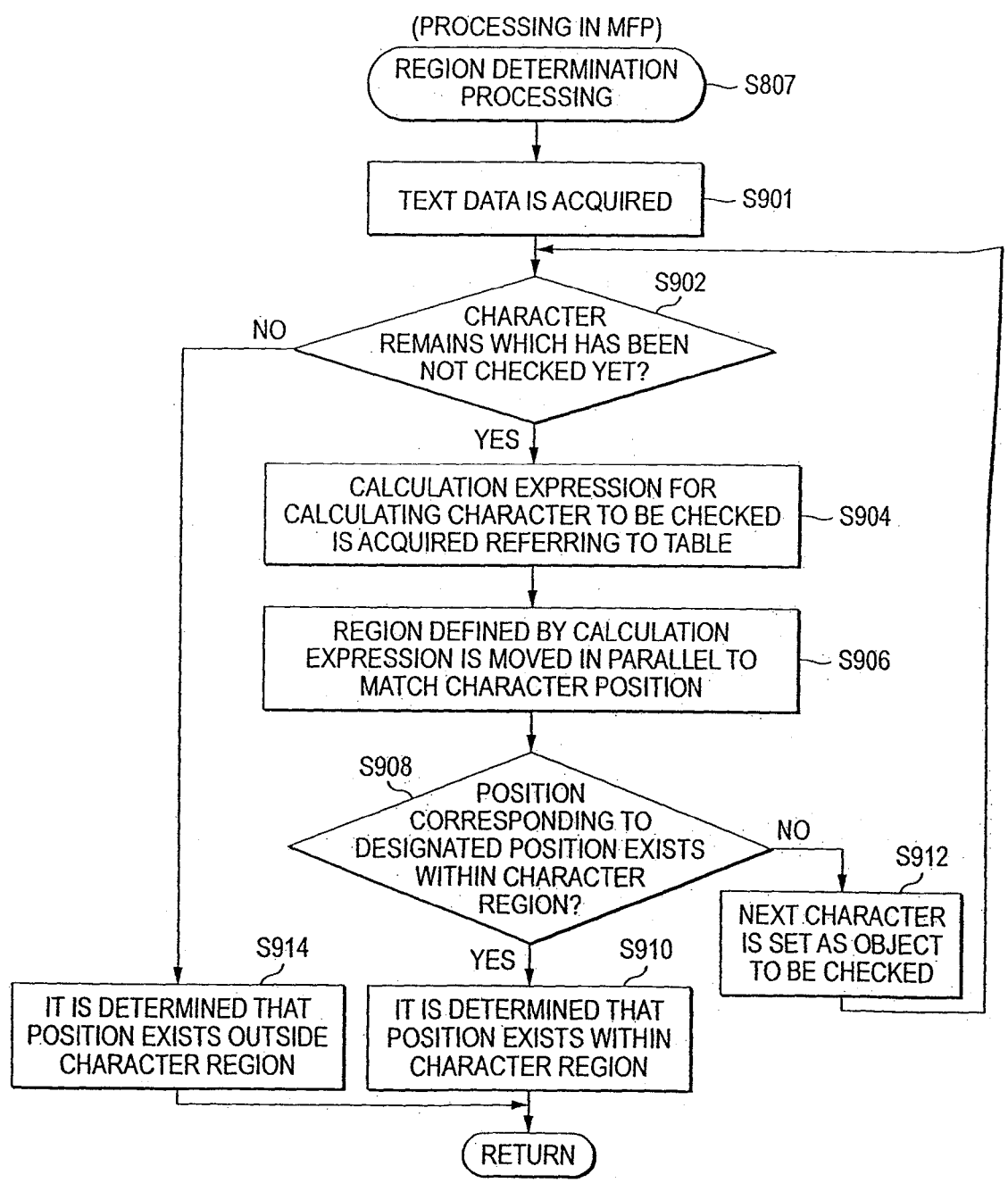
FIG. 9A is a flow chart showing region determination processing.

As shown in FIG. 9A, in the region determination processing (S807), text data of a character string included in the additional image 42 is first acquired (S901). Then, processing for checking characters one by one is started. First, it is determined whether a character remains, which has been not checked yet (S902).

Since the determination in step S902 is positive at first (S902: Yes), a calculation expression for calculating the character region 51 of a character to be checked is acquired referring to the character region definition table 12b (see FIG. 2) (S904).

Figure 9B:
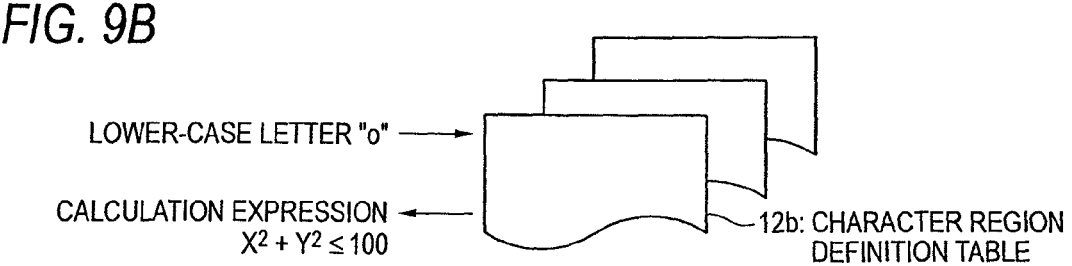
FIG. 9B is a view showing an example of the relationship between a character region definition table and a calculation expression.

The relationship between the character region 51 and the calculation expression will be described with reference to FIG. 9B. FIG. 9B is a view showing an example of the relationship between the character region definition table 12b and the calculation expression. In step S902, a calculation expression for a character to be checked is first acquired from the character region definition table 12b. For example, when the character to be checked is 'o' of a lower-case letter, $x^2+y^2 \leq 100$ is acquired as a calculation expression, for example. That is, a region including the lower-case letter 'o' is defined as a circle which has a radius of 10 and has (x, y) as a center. Such a calculation expression is usually included in font data stored previously in the ROM 12 of the MFP 1. The font data is used for display and the like and stores various kinds of characters or fonts in addition to alphabet shown in FIG. 9C. Accordingly, the calculation expression can be acquired from font data corresponding to the font by determining which kind of font is used in text data included in an additional image.

Referring back to FIG. 9A, then, the region defined by the calculation expression is moved in parallel to match the position of a character to be checked (S906). Then, the character region 51 of the character to be checked is determined based on the position of the character to be checked.

Figure 9C:
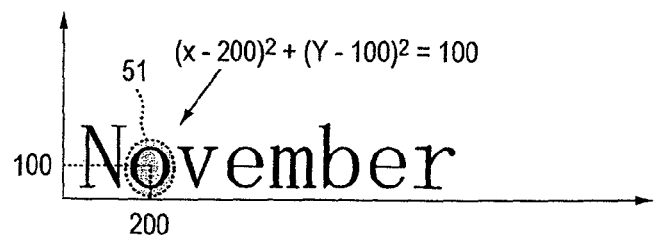
FIG. 9C is a view showing the relationship between a calculation expression and a character region determined from the calculation expression.
Figure 10:
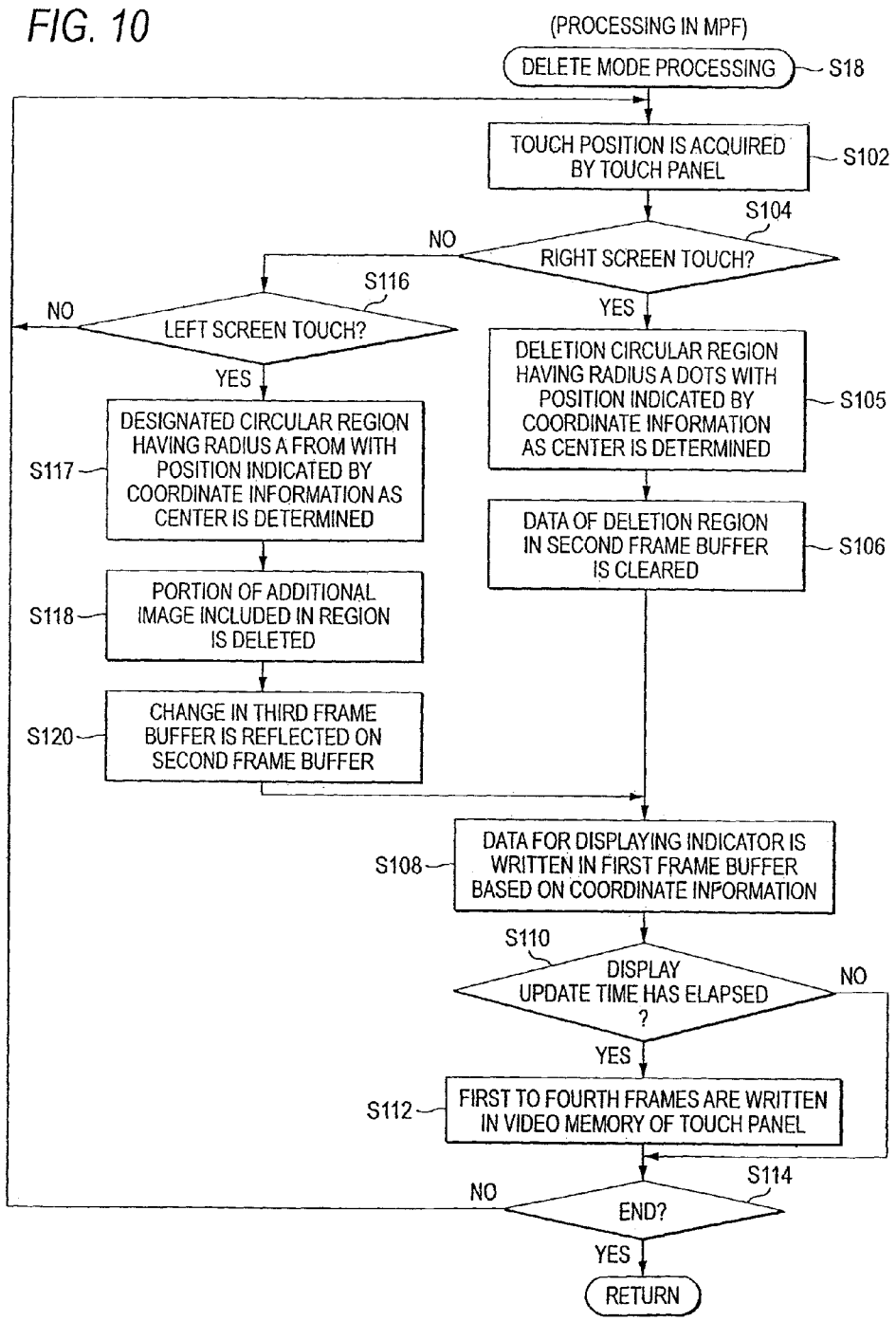
FIG. 10 is a flow chart showing delete mode processing.

For example, when the position of the lower-case letter 'o' in the additional image 42 is the coordinates (200, 100) on the touch panel as shown in FIG. 9C, the character region 51 of the lower-case letter 'o' in the additional image 42 is determined as the following relational expression (1) based on the coordinates and the calculation expression:

$$(x-200)^2+(y-100)^2 \leq 100 \quad (1)$$

Then, it is determined whether a position on the left screen 44 corresponding to the designated position (coordinate information (xr, yr)) on the right screen 43 is included in the character region 51 (S908). For example, when the coordinates of the position on the left screen 44 are (0, 0), the relationship of the expression (1) is not satisfied as shown in the following expression (2) as substituting x=0 and y=0 into a left side of the relational expression (1). As a result, it is determined that the position is outside the character region 51.

$$(0-200)^2+(0-100)^2 > 100 \quad (2)$$

When the determination in step S908 is negative (S908: No), a next character is set as an object to be checked (S912), and the process returns to step S902. Then, if processing on all characters are completed after repeating the processing, the determination in step S902 becomes negative (S902: No). Then, it is determined that the position is outside the character region 51, and the process returns to step S808 in FIG. 8.

On the other hand, when a character that makes the determination in step S908 positive is found (S908: Yes), it is determined that the position is within the character region 51, and the process returns to step S808 in FIG. 8.

According to the region determination processing (S807), it is possible to determine which character area 51 of the additional image 42 the position on the left screen 44 corresponding to a position on the right screen 43 designated by the user is included in.

In the delete mode processing (S14), a touch position is first acquired from the touch panel 7 (S102). Then, it is determined whether the right screen 43 of the LCD 5 is touched, that is, designated from the outside (S104). When the determination in step S104 is positive (S104: Yes), coordinate information (xr, yr) indicating the touch position on the right screen 43 is then calculated and a delete circular region (not shown) having the radius of A dots with a position indicated by the coordinate information (xr, yr) as a center is determined (S105).

Then, data of pixels included in the delete region in the second frame buffer 13c is cleared (S106), and the process proceeds to step S108. The cleared portion returns to original white pixel data.

Then, in step S112 to be described later, a portion, which is displayed in the determined delete region, of the additional image combined in the original image 41 of the right screen 43 is deleted by combining the second frame 62 with the fourth frame 64 and accordingly the original image 41 is displayed on the delete region.

In this manner, the user can return to the display of original image by deleting an additional image only by touching an arbitrary portion in a display area of the additional image combined in the original image 41. As a result, a combined image that satisfies the user's preference can be displayed. In addition, the user can edit a display image with a sense like exposing the lower original image by deleting the additional image put on the original image, and therefore, the user can easily see operation and perform operations intuitively.

In addition, although only the additional image which is combined in the original image 41 and is displayed on the right screen 43 is deleted in step S106 in the present exemplary embodiment, a portion of the additional image 42 displayed in a corresponding region of the left screen 44 may also be deleted together.

On the other hand, when the determination in step S104 is negative (S104: No), it is then determined whether the left screen 44 of the LCD 5 is touched (S116). When the determination in step S116 is negative (S116: No), the process returns to step S102. However, when the determination in step S116 is positive (S116: Yes), coordinate information (x1, y1) indicating the touch position on the left screen 44 is calculated and the circular region 48 (see FIG. 3D) having the radius of A dots with the coordinate information (x1, y1) as a center is determined (S117).

Then, data of pixels, which are included in the circular region 48 based on the designated position, of the third frame buffer 13d is replaced with data of the background color (S118). In the subsequent step S112, a portion displayed in the region 48 of the additional image 42 is deleted. Although the deletion is performed by replacing the inside of the entire region 48 with the background color in the present exemplary embodiment, the region 48 may also be replaced with black data or white data, for example.

A change in the third frame buffer 13d is reflected on the second frame buffer 13c. That is, although data obtained by coping the third frame buffer 13d is stored in a portion corresponding to the designated region 45 of the second frame buffer 13c as described above, the MFP 1 reads data of the portion corresponding to the designated region 45 again from the third frame buffer 13d and copies the data to the second frame buffer 13c (S120).

In this case, deletion of the portion of the additional image 42 on the left screen 44 is reflected in the combined image displayed on the right screen 43, that is, reflected in the additional image combined in the original image 41 in the subsequent step S112.

Then, the process proceeds to step S108 in which data for displaying the indicator 47 corresponding to the position indicated by the coordinate information (xr, yr) or coordinate information (x1, y1) is written in the first frame buffer 13b (S108).

Then, it is determined whether the display update time set in advance has elapsed (S110). When the determination in step S110 is positive (S110: Yes), data obtained by overlapping the frames 61, 62, 63, and 64 is written in the video memory 13a (S112).

Herein, when it is determined that the right screen 43 is touched in step S104 (S104: Yes), the first frame 61 and the third frame 63 are made to overlap and are then written in the region corresponding to the left screen 44 of the video memory 13a in step S112. In this manner, the indicator 47 is displayed at the corresponding position of the left screen 44, as described with reference to FIGS. 3A to 3C.

On the other hand, when it is determined that the left screen is touched in step S116 (S116: Yes), the first frame 61, the second frame 62, and the fourth frame 64 are made to overlap and are then written in the region corresponding to the right screen 43 of the video memory 13a. That is, as described with reference to FIG. 3D, the MFP 1 moves the indicator 47 to the position on the right screen 43 corresponding to the designated position on the left screen when a touch on the left screen 44 is detected.

In addition, when the determination in step S110 is negative (S110: No), the processing of S112 is skipped.

Then, it is determined whether the user is instructed to end the delete mode processing (S18) (S114). When the determination in step S114 is negative (S114: No), the process returns to step S102 to repeat the processing.

When the determination in step S114 is positive (S114: Yes) while repeating the processing as described above, the delete mode processing (S14) is ended.

According to the delete mode processing, the user can delete a part of the additional image combined in the original image 41 using either the right screen 43 or the left screen 44. If the right screen 43 is used, an image can be edited by directly designating a portion, which is to be deleted, of the additional image combined in the original image 41, which is convenient.

The additional image 42 which is not combined in the original image 41 is displayed on the left screen 44. If a portion, which is to be deleted, of the additional image 42 is directly designated, the operation can also be reflected not only on the left screen 44 but also on the right screen 43. This is convenient for a case in which not only the combined image but also the additional image 42 needs to be changed.

Thus, in the present exemplary embodiment, results of the combined image finally displayed are different between a case where a deletion operation is performed on the right screen 43 and a case where the deletion operation is performed on the left screen 44. Accordingly, it is advantageous that the user appropriately switch whether to perform the deletion operation on the right screen 43 or to perform the deletion operation on the left screen 44 based on the result of a combined image that the user wants.

While the present invention has been shown and described with reference to certain exemplary embodiments thereof, it will be understood by those skilled in the art that various changes in form and details may be made therein without departing from the spirit and scope of the invention as defined by the appended claims.

For example, in the present exemplary embodiment, although the indicator 47 moves according to a position that the user designates, the indicator 47 may not start moving until the user performs a predetermined operation.

Figure 11:
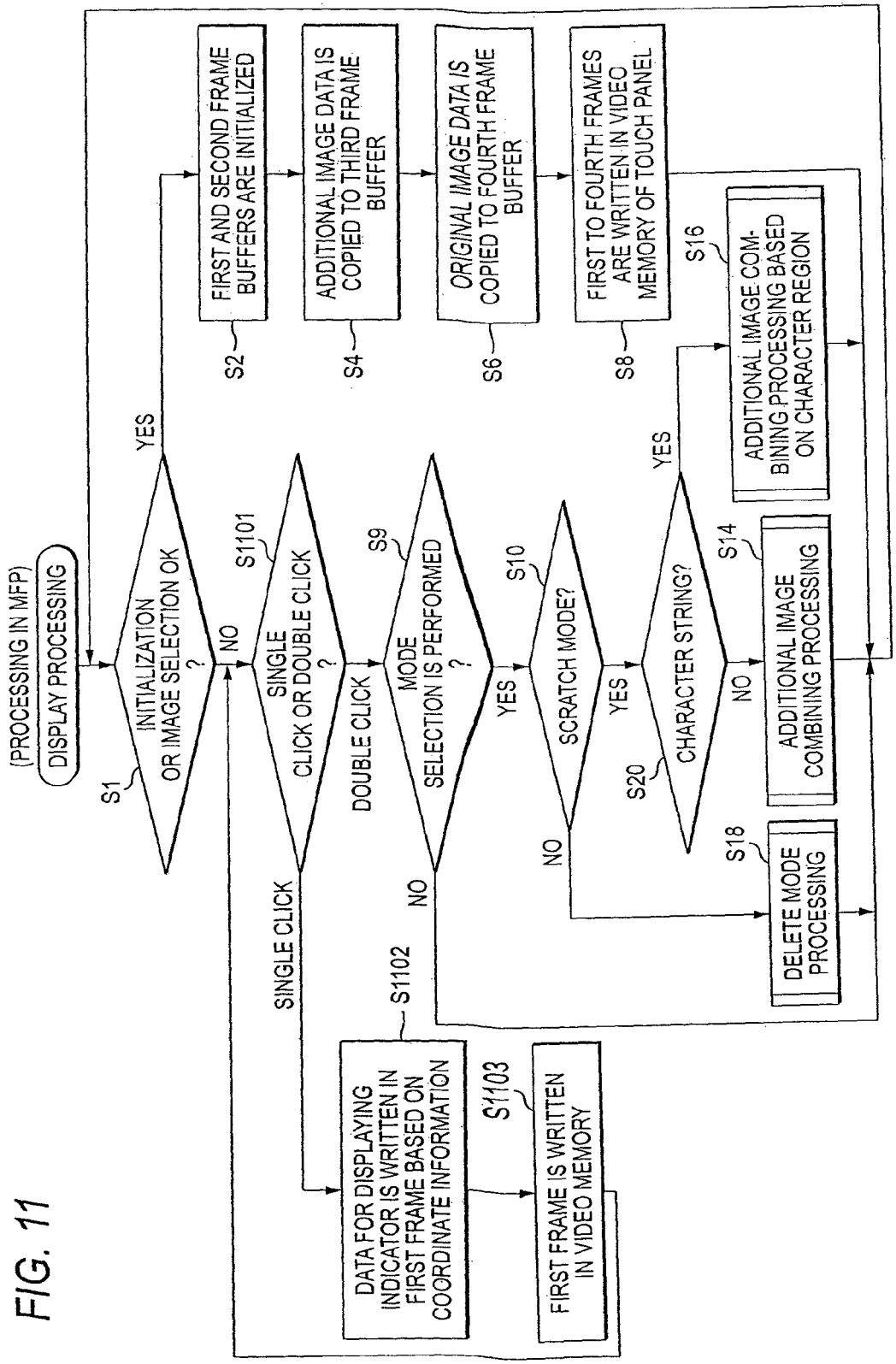
FIG. 11 is a flow chart showing display processing in a modified example.

The display processing shown in FIG. 11 is different from the display processing shown in FIG. 6 in that steps S1101, S1102, and S1103 are provided, but subsequent processing is similar. Accordingly, portions in the flow chart shown in FIG. 11 similar to those in the flow chart shown in FIG. 6 are denoted by the same reference numerals, and an explanation thereof will be omitted.

First, in a state where the original image 41 is displayed on the right screen 43 of the LCD 5 and the additional image 42 is displayed on the left screen 44, it is determined whether single click or double click is performed on the LCD 5 based on a detection result of the touch panel 7 (S1101). Herein, although not shown, the processing is in a standby state when neither the single click nor the double click is input.

When the LCD 5 is single-clicked (S1101: single click), coordinate information (x, y) of the single-clicked position is specified and data for displaying the indicator 47 at a position, which corresponds to the position indicated by the coordinate information (x, y), on an opposite screen (left screen 44 if the right screen 43 is single-clicked) of the single-clicked screen is written in the first frame 61 (S1102). Then, the third frame 63 is written in the region for display of the left screen 44 in the video memory 13a, and the second frame 62 and the fourth frame 64 are combined in a region for display of the right screen 43. Then, the first frame is overlapped in a region for display of the opposite screen of the single-clicked screen (S1103), and process returns to step S1101.

Accordingly, when the user single-clicks on the LCD 5, the indicator 47 is displayed at the position on the opposite screen corresponding to the single-clicked position. Accordingly, the user can check the position on the opposite screen corresponding to the single-clicked position by single-clicking on the LCD 5.

On the other hand, when it is determined that the LCD 5 is double-clicked in step S1101 (S1101: double click), the process proceeds to step S9 to execute the processing described with reference to FIG. 6. That is, the indicator 47 is displayed at the position that the user wants by single-clicking on the LCD 5, and then region designation is started according to the position that the user designates by double-clicking on the LCD 5 and the indicator 47 moves.

According to the display processing according to the modified example, for example, by single-clicking on one point in the original image 41 displayed on the right screen 43, a position of the left screen 44 corresponding to the position can be viewed by the indicator 47. Therefore, when the user single-clicks on a position of the displayed original image 41, at which the additional image 42 is considered to be combined, a portion of the additional image 42 combined at the position can be confirmed by the indicator 47.

In addition, when the position of the left screen 44 corresponding to the single-clicked position is not a position that the user wants, the user can find a position on the right screen 43 corresponding to a desired position on the left screen 44 by repeating the single click. Then, when the position on the right screen 43 corresponding to the desired position on the left screen 44 is found, the user can start designating the position, at which the additional image is combined, by double-clicking on the position as a start point.

In addition, in the above-described exemplary embodiment, the original image 41 and the additional image 42 are displayed in parallel on one screen. However, for example, when two display units are provided, the original image 41 and the additional image 42 may be separately displayed on the display units.

Further, in the above-described exemplary embodiment, the multi functional peripheral is explained. However, the inventive concept of the present invention can be also applied to other devices, such as a scanner and a printer.

Further, although data read from the memory card is used as original image data in the above-described exemplary embodiment, the present invention is not limited thereto. The inventive concept of the present invention may also be applied to a case in which data received from a PC connected through a network or data read by a scanner is used as the original image data.

Further, in the exemplary embodiment, the circular region having the radius of A dots with a touch position as a center is specified as the designated region 45 and the 'A' is a value set in advance. However, the present invention is not limited thereto. For example a value that defines the width of the designated region 45 may be set based on the vertical width of the original image 41 displayed on the LCD 5. In this case, the user can easily designate a suitable region that matches the size of the original image 41 to be edited.

Further, a square region or triangular region having a specific side with a touch position as a center may be specified as the designated region 45.

What is claimed is:

1. An image processing apparatus comprising:
    a display unit which displays an image;
    a detection unit which detects a position on the display unit designated from an outside;
    an original image display unit which displays an original image based on original image data in a first display area on the display unit;
    a specifying unit which, when a position within the first display area is designated from the outside, specifies a designated region corresponding to the designated position in the first display area based on a detection result of the detection unit by adding a width to a locus of the designated position detected by the detection unit, as the designated region;
    a combining unit which displays at least a part of an additional image based on additional image data in the designated region in the first display area to display a combined image, in which the original image and the additional image are combined, on the display unit, and
    an additional image display unit which displays the additional image in a second display area adjacent to the first display area on the display unit,
    wherein a size of the designated region changes based on the designation of the position within the first display from the outside,
    wherein the specifying unit specifies a corresponding region in the second display area that corresponds to the designated region in the first display area, in response to the designated region in the first display area being specified, wherein the specifying unit updates the designated region according to a change of the designated position detected by the detection unit,
    wherein the combining unit combines a portion of the additional image, which is displayed in the corresponding region specified in the second display area, in the designated region of the original image to display the combined image, and
    wherein the combining unit updates display of the combined image based on the updated designated region as the specifying unit updates the designated region.

2. The image processing apparatus according to claim 1, further comprising:
a distinction display unit which displays the designated region on the display unit distinguishably from a region other than the designated region in the first display area.

3. The image processing apparatus according to claim 1, wherein the additional image display unit displays the additional image with a same display magnification as the additional image combined in the original image by the combining unit.

4. The image processing apparatus according to claim 1, further comprising:
an additional image deleting unit which, when it is determined that a position within the second display area is designated based on the detection result of the detection unit, deletes a portion of the additional image displayed in the second display area, the portion corresponding to the designated position; and
a reflecting unit which reflects deletion of the portion of the additional image by the additional image deleting unit, on the combined image displayed by the combining unit.

5. The image processing apparatus according to claim 1, further comprising:
an indicator display unit which displays an indicator for indicating a position in the second display area corresponding to the designated position within the first display area, on the second display area; and
an indicator moving unit which, when designation of a position in the second display area is detected by the detection unit, controls the indicator display unit to move the indicator to a position in the first display area corresponding to the designated position in the second display area.

6. The image processing apparatus according to claim 1, wherein the first display area and the second display area have a same size.

7. The image processing apparatus according to claim 1, further comprising a character region determining unit which, when a character string is included in the additional image, determines a character region for each of a plurality of characters included in the character string, the character region for each character being defined as a region including an entire display area of the character,
wherein, when a position in the second display area corresponding to the designated position in the first display area is included in one of the character regions, the specifying unit specifies the designated region so as to include the one of the character region.

8. The image processing apparatus according to claim 1, further comprising: a deletion region determining unit which determines a deletion region in the additional image combined in the combined image based on a position in the first display area designated from an outside; and a combined image editing unit which deletes a portion of the additional image combined in the combined image, the portion being displayed in the deletion region.

9. A non-transitory, computer-readable medium having a computer program stored thereon and readable by a computer including a display unit which displays an image, an additional image display unit which displays an additional image, and a detection unit which detects a position on the display unit designated from an outside, the computer program, when executed by the computer, causing the computer to perform operations comprising:
displaying an original image based on original image data in a first display area on the display unit;
specifying a designated region corresponding to the designated position in the first display area based on a detection result of the detection unit when a position within the first display area on the display unit is designated from the outside by adding a width to a locus of the designated position detected by the detection unit, as the designated region;
displaying at least a part of the additional image based on additional image data in the specified designated region in the first display area to display a combined image, in which the original image and the additional image are combined, on the display unit;
displaying the additional image on the additional image display unit in a second display area, wherein the second display area is adjacent to the first display area;
specifying a corresponding region in the second display area that corresponds to the designated region in the first display area, in response to the designated region in the first display area being specified, wherein the designated region is updated according to a change of the designated position detected by the detection unit, and
combining a portion of the additional image, which is displayed in the corresponding region specified in the second display area, in the designated region of the original image to display the combined image,
wherein a size of the designated region changes based on the designation of the position within the first display from the outside, and
wherein the display of the combined image is updated based on the updated designated region as the specifying unit updates the designated region.

* * * * *